United States Patent
Chakrabarti et al.

(10) Patent No.: US 8,117,606 B2
(45) Date of Patent: Feb. 14, 2012

(54) SYSTEM AND METHOD FOR APPLICATION MIGRATION IN A GRID COMPUTING ENVIRONMENT

(75) Inventors: Anirban Chakrabarti, Kolkata (IN); Shubhashis Sengupta, Bangalore (IN); Anish Damodaran, Calicut (IN)

(73) Assignee: Infosys Technologies Ltd. (IN)

(*) Notice: Subject to any disclaimer, the term of this patent is extended or adjusted under 35 U.S.C. 154(b) by 1289 days.

(21) Appl. No.: 11/810,133

(22) Filed: Jun. 4, 2007

(65) Prior Publication Data
US 2008/0300851 A1    Dec. 4, 2008

(51) Int. Cl.
*G06F 9/45* (2006.01)

(52) U.S. Cl. ........ 717/156; 717/152; 717/153; 717/157; 717/158

(58) Field of Classification Search ........... 717/151–159
See application file for complete search history.

(56) References Cited

U.S. PATENT DOCUMENTS

| | | | |
|---|---|---|---|
| 5,903,730 A | 5/1999 | Asai et al. | |
| 6,085,029 A * | 7/2000 | Kolawa et al. | 714/38.13 |
| 6,282,708 B1 | 8/2001 | Augusteijn et al. | |
| 6,339,840 B1 | 1/2002 | Kothari et al. | |
| 6,430,590 B1 | 8/2002 | Fischer | |
| 7,039,251 B2 | 5/2006 | Fisher et al. | |
| 7,539,602 B2 * | 5/2009 | Willis | 703/2 |
| 7,797,062 B2 * | 9/2010 | Discenzo et al. | 700/28 |
| 2003/0014742 A1 * | 1/2003 | Seth et al. | 717/158 |
| 2004/0267395 A1 * | 12/2004 | Discenzo et al. | 700/99 |
| 2008/0201721 A1 * | 8/2008 | Little et al. | 718/106 |

FOREIGN PATENT DOCUMENTS

EP    0415497    3/1991

* cited by examiner

*Primary Examiner* — Anna Deng
(74) *Attorney, Agent, or Firm* — Lerner, David, Littenberg, Krumholz & Mentlik, LLP

(57) ABSTRACT

A system and method for assessing performance of a software application migrated to a grid infrastructure is provided. The system comprises a grid code analyzer for generating a directed acyclic graph (DAG) corresponding to the software application by performing static and dynamic analysis; a grid task generator for reducing the DAG generated by the grid code analyzer; and a grid simulator for simulating performance of the software application on one or more predetermined grid infrastructures. The grid simulator accepts the reduced DAG as input and produces performance data as output.

28 Claims, 5 Drawing Sheets

SYSTEM AND METHOD FOR APPLICATION MIGRATION IN A GRID COMPUTING ENVIRONMENT

BACKGROUND OF THE INVENTION

The present invention is directed towards providing a framework for migrating software applications to a grid computing environment. More particularly, the present invention provides a system and method for assessing the performance of legacy applications migrated to a grid infrastructure by analyzing the legacy application and running the analyzed legacy application on a grid simulator in a format acceptable to the grid simulator.

Grid computing aims at maximizing the use of available processing resources for applications having intensive computing requirements. The use of grid computing for solving large scale computational problems by using the resources of a plurality of heterogeneous computer systems connected by a network (such as the Internet) is becoming more prevalent. In order for an enterprise to successfully adopt a grid computing environment it is critical to migrate legacy enterprise applications (i.e. antiquated applications that have been inherited from languages, platforms, and techniques older than current technology) to a grid infrastructure. Legacy applications such as analytical applications (trading, risk calculations, Monte Carlo simulations), backend batch applications (actuarial, billing, customer relationship management (CRM)), and applications dealing with huge data (business intelligence, data mining, pattern matching) are being seen as prime candidates for grid deployment in order to obtain high performance and throughput.

Migrating legacy applications to a grid computing environment remains a challenging proposition for software professionals. The several challenges faced by software professionals while migrating legacy applications to a grid infrastructure include incorporating seamless integration of various security policies and controls in the grid and managing the heterogeneous and complex grid infrastructure efficiently. Migration of a legacy application typically involves re-engineering of the application code which in turn involves significant investments in terms of domain knowledge and specialists' judgments on application analysis and re-engineering. Further, the performance gain obtainable after migration is not predictable. Hence, enterprises are reluctant in investing money and resources for migrating legacy applications without being certain of any performance benefit.

It is essential that a legacy application is analyzed for determining an estimate of the amount of performance benefit obtainable on migrating the application to a grid infrastructure before the application code is re-engineered. Such an analysis provides enterprises with a tool for understanding the benefits of migration. Enterprise legacy applications comprise complexities in terms of data, module, and temporal dependencies among various modules of the application. When a legacy application is migrated to a grid environment, there is a need to analyze the application for parallelization while maintaining dependencies in order to ensure performance benefit on distributing the application across the grid.

Consequently, there is need for a system and a method for analyzing the performance of legacy applications running in a grid environment. A comparative analysis between performances of a legacy application before and after migration to a grid infrastructure would enable enterprises to take an informed decision regarding migration to a grid infrastructure. Further the analysis of legacy applications would also provide inputs for any re-engineering of the applications that may have to be performed for the purpose of migration.

SUMMARY OF THE INVENTION

A system for assessing performance of a software application migrated to a grid infrastructure is provided. The system comprises a grid code analyzer for generating a directed acyclic graph (DAG) corresponding to the software application by performing static and dynamic analysis; a grid task generator for reducing the DAG generated by the grid code analyzer; and a grid simulator for simulating performance of the software application on one or more predetermined grid infrastructures, the grid simulator accepting the reduced DAG as input and producing performance data as output. In an embodiment of the present invention, the grid task generator reduces the generated DAG by clustering two or more nodes of the DAG by using one or more clustering algorithms and by using one or more node compression algorithms for reducing the number of nodes of the DAG. Further, in an embodiment of the present invention, the grid simulator implements one or more scheduling algorithms for scheduling the input DAG on the one or more predetermined grid infrastructures.

The grid code analyzer comprises a static analyzer for statically analyzing the software application, and comprising a parser for parsing the software application by analyzing dependencies between two or more sections of the software application and partitioning the software application into virtual blocks for removing dependency loops in the DAG corresponding to the software application, each node of the DAG representing at least one virtual block; and a code instrumentor for inserting instrument strings in the software application for capturing run time and dependency information. The grid code analyzer also comprises a dynamic analyzer for dynamically analyzing the software application, and comprising a central processing unit (cpu) profiler for determining the cpu time required for processing each virtual block for obtaining node weights corresponding to each node of the DAG, and a memory profiler for determining an amount of data exchanged between a pair of virtual blocks for obtaining edge weight of an edge linking the two nodes of the DAG corresponding to the pair of virtual blocks.

The grid code analyzer further comprises a symbol table for storing information regarding symbols such as types, constants, functions and variables declared in the software application. The symbol table is created during static analysis of the software application and is used for dynamic analysis. In an embodiment of the present invention, the symbol table is implemented as a hash table wherein a scope number, a block number and a variable name are used for generating keys corresponding to each symbol declared in the software application. The grid code analyzer further comprises a memory map for maintaining an updatable record of memory allocated on heap during run time of the software application. The memory map is created and used during dynamic analysis of the software application for determining data exchanged between a pair of virtual blocks. In an embodiment of the present invention, the memory map is a data structure implemented as a balanced binary search tree. Further, in an embodiment of the present invention, the instrument strings are inserted before and after each virtual block for capturing the run time information of each virtual block during dynamic analysis of the software application and are also inserted based on dependency relations between two virtual blocks which is determined during parsing of the software application. The memory profiler uses a memory tracking function for determining amount of data exchanged between the pair of virtual blocks by using a programming language operator for determining memory allocated on stack, and by dereferencing a pointer variable for determining memory allocated on heap.

A method for assessing performance of a software application migrated to a grid infrastructure is also provided. The method comprises the steps of firstly generating a directed acyclic graph (DAG) corresponding to the software application by performing static and dynamic analysis; secondly reducing the generated DAG; thirdly simulating performance of the software application by inputting the reduced DAG to one or more predetermined grid infrastructures and obtaining performance data as output; and lastly analyzing the performance data for assessing the performance of the software application on the one or more predetermined grid infrastructures.

The step of generating a DAG comprises statically analyzing the software application by parsing the software application and inserting instrument strings in the software application for capturing run time information. The software application is parsed by determining dependencies between two or more sections of the software application and partitioning the software application into virtual blocks for removing dependency loops in the DAG where each node of the DAG represents at least one virtual block. Instrument strings are inserted in the software application by tracking the execution path and the data changes occurring during execution of the software application. The step of generating a DAG further comprises dynamically analyzing the software application by determining the cpu time required for processing each virtual block for obtaining node weights corresponding to each node of the DAG, and determining amount of data exchanged between a pair of virtual blocks for obtaining edge weight of an edge linking the two nodes of the DAG corresponding to the pair of virtual blocks.

In an embodiment of the present invention, the step of parsing comprises determining dependencies such as hierarchical dependencies, argument level dependencies, global value dependencies and return value dependencies. Further, the step of inserting instrument strings comprises inserting at least a start block and an end block instrument strings at the commencement and end of a virtual block respectively for profiling the software application and estimating the running time of each virtual block. In an embodiment of the present invention, the step of reducing the generated DAG comprises reducing the number of nodes of the DAG by using one or more node compression algorithms and clustering two or more nodes of the DAG by using one or more clustering algorithms. Also, the step of simulating performance of the software application on one or more predetermined grid infrastructures comprises implementing one or more scheduling algorithms for scheduling the input DAG on the one or more predetermined grid infrastructures.

In various embodiments of the present invention, the method for assessing performance of a software application migrated to a grid infrastructure may be provided as a computer program product having computer readable instructions embodied therein.

BRIEF DESCRIPTION OF THE DRAWINGS

The present invention is described by way of embodiments illustrated in the accompanying drawings wherein.

DETAILED DESCRIPTION

A system and a method for assessing performance of software applications migrated to a grid infrastructure are described herein. Performance of software applications such as legacy applications migrated to a grid infrastructure is assessed by firstly analyzing a legacy application and subsequently running the analyzed legacy application on a grid simulator in a format acceptable to the grid simulator. The method of the invention may be provided on a computer readable medium.

The following disclosure is provided in order to enable a person having ordinary skill in the art to practice the invention. Exemplary embodiments are provided only for illustrative purposes and various modifications will be readily apparent to persons skilled in the art. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

The present invention would now be discussed in context of embodiments as illustrated in the accompanying drawings.

Figure 1:
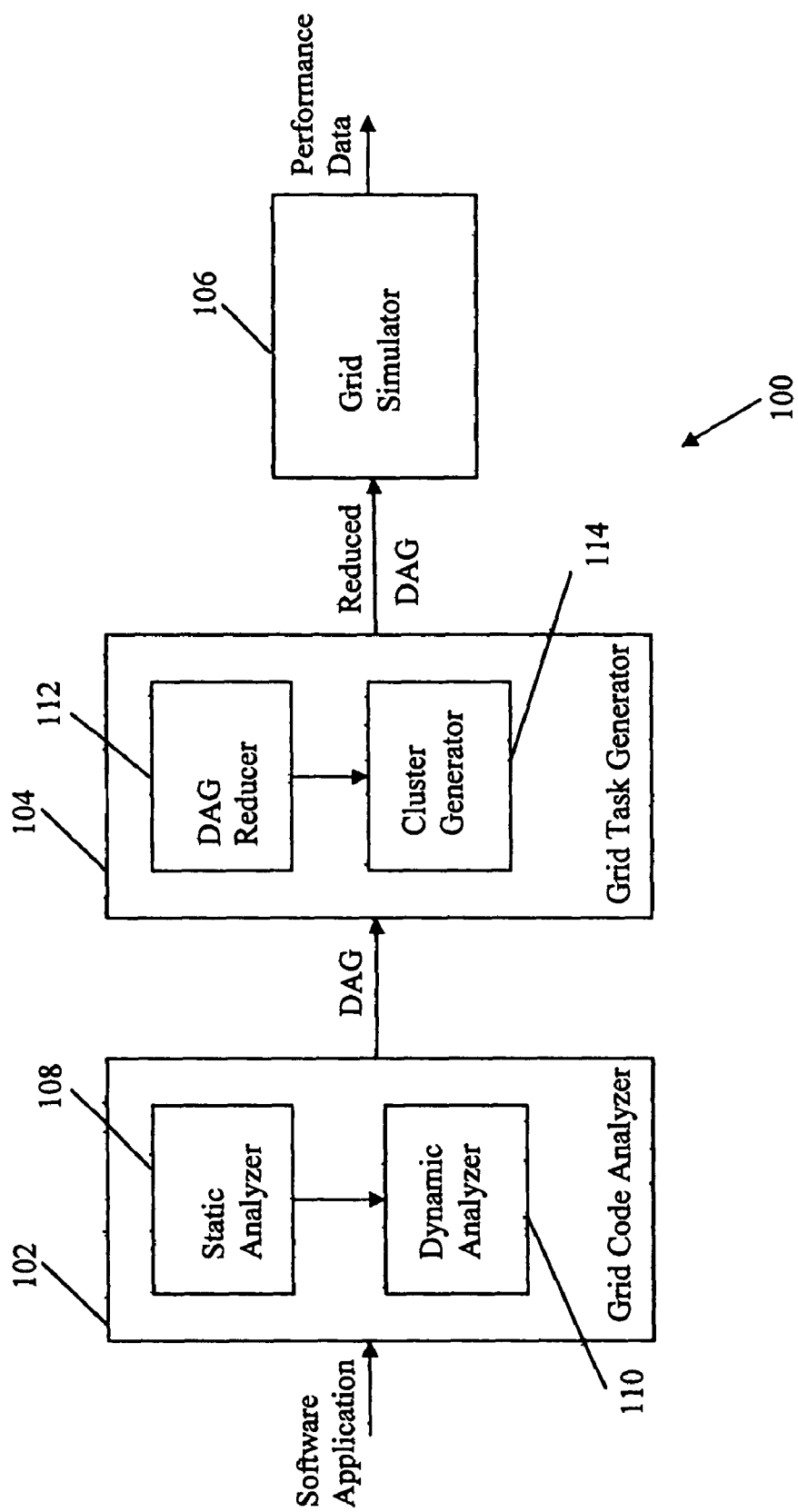
FIG. 1 is a block diagram depicting a system for assessing the performance of a legacy application migrated to a grid infrastructure.

FIG. 1 is a block diagram depicting a system for assessing the performance of a legacy application migrated to a grid infrastructure. System 100 comprises a Grid Code Analyzer (GCA) 102, a Grid Task Generator (GTG) 104 and a Grid Simulator (GS) 106. GCA 102 comprises a Static Analyzer 108 and a Dynamic Analyzer 110. GTG 104 comprises a Directed Acyclic Graph Reducer (DAGR) 112 and a Cluster Generator (CG) 114.

In various embodiments of the present invention, GCA 102 accepts a legacy application as input and analyzes and profiles the legacy application program code by performing static and dynamic analysis. In an embodiment of the present invention, GCA 102 takes a legacy application program coded in a programming language such as C, C++, or Java as input and generates a Directed Acyclic Graph (DAG) which depicts both task and data dependencies among various modules of the legacy application program. In an alternate embodiment of the present invention GCA 102 may accept a binary code derived from the source code of a legacy application as input.

Legacy applications comprise one or more application tasks. In order to migrate a legacy application to a grid computing environment, the application tasks corresponding to the legacy application are required to be scheduled for parallel execution on a plurality of the available computing platforms in the grid. As is known in the art, a DAG is a standard structure used for representation of application tasks to be scheduled in any distributed system such as clusters or grids. A DAG comprises one or more nodes and edges, wherein a node represents an application task and an edge represents the transfer of data between two application tasks. Each node and edge is associated with a weight where a node weight represents running time of an application task and an edge weight represents a measure of data exchanged between the two nodes or the two tasks connected by the edge.

Static Analyzer 108 performs static analysis of an input legacy application, in order to generate a preliminary DAG structure corresponding to the legacy application. Static analysis alone does not result in collection of all the information required for generation of the DAG as some application tasks and the data exchanged between the application tasks may dynamically change during execution of the legacy application. Hence, dynamic analyzer 110 performs dynamic analysis of the input legacy application for obtaining a measure of data transferred between one or more application tasks during run-time, in order to complete the preliminary DAG structure generated by Static Analyzer 108. In an embodiment of the present invention dynamic analysis is also performed in order to capture probable execution paths within the legacy application, in case the execution of the legacy application is non-deterministic in nature.

In various embodiments of the present invention, GTG 104 accepts a DAG as input and analyzes the DAG for firstly reducing nodes of the DAG in order to obtain application tasks of a required granularity that may be processed by GS 106, and then grouping the reduced nodes to obtain clusters of application tasks. The generated clusters represent the groups of application tasks that may be parallely fed to the plurality of computing platforms available in a grid infrastructure simulated by GS 106. A DAG generated by the GCA 102 for a typical enterprise scale legacy application may comprise millions of DAG nodes, which may not be an ideal input for GS 106. Hence, DAGR 112 reduces a DAG corresponding to a legacy application program code, while maintaining the DAG structure and CG 114 creates a set of clusters of nodes of the reduced DAG.

GS 106 accepts a reduced DAG comprising clusters of application tasks as input and simulates the performance of the legacy application under different grid infrastructures. In an embodiment of the present invention, GS 106 is a process based simulator, such as is well known in the art. GS 106 may be coded in a programming language such as java, and takes a DAG or a set of DAGs as input and schedules the DAG(s) on a defined grid infrastructure. A grid infrastructure may be defined by defining processors, links, and data elements. Processors may be defined as having a specific processing power, while links may be defined as having a specific link capacity or bandwidth. In various embodiments of the present invention, different scheduling algorithms such as Round Robin, Priority based, Match Making, etc., are implemented in GS 106 for scheduling the input DAG on the defined grid infrastructure. In an embodiment of the present invention, a plurality of DAG based clustering algorithms, replication mechanisms, and enterprise specific policies and rules may also be implemented in GS 106. The performance data such as time taken for computation or the speed of computation output by GS 106 is analyzed to arrive at the advantages and disadvantages (in terms of speed and time of computing) of migrating the legacy application to the defined grid infrastructure. The performance data may be analyzed by using graphs, data charts and various other comparative analysis techniques well known in the art. Hence system 100 enables an informed decision making while migrating a legacy application to a grid infrastructure.

Figure 2:
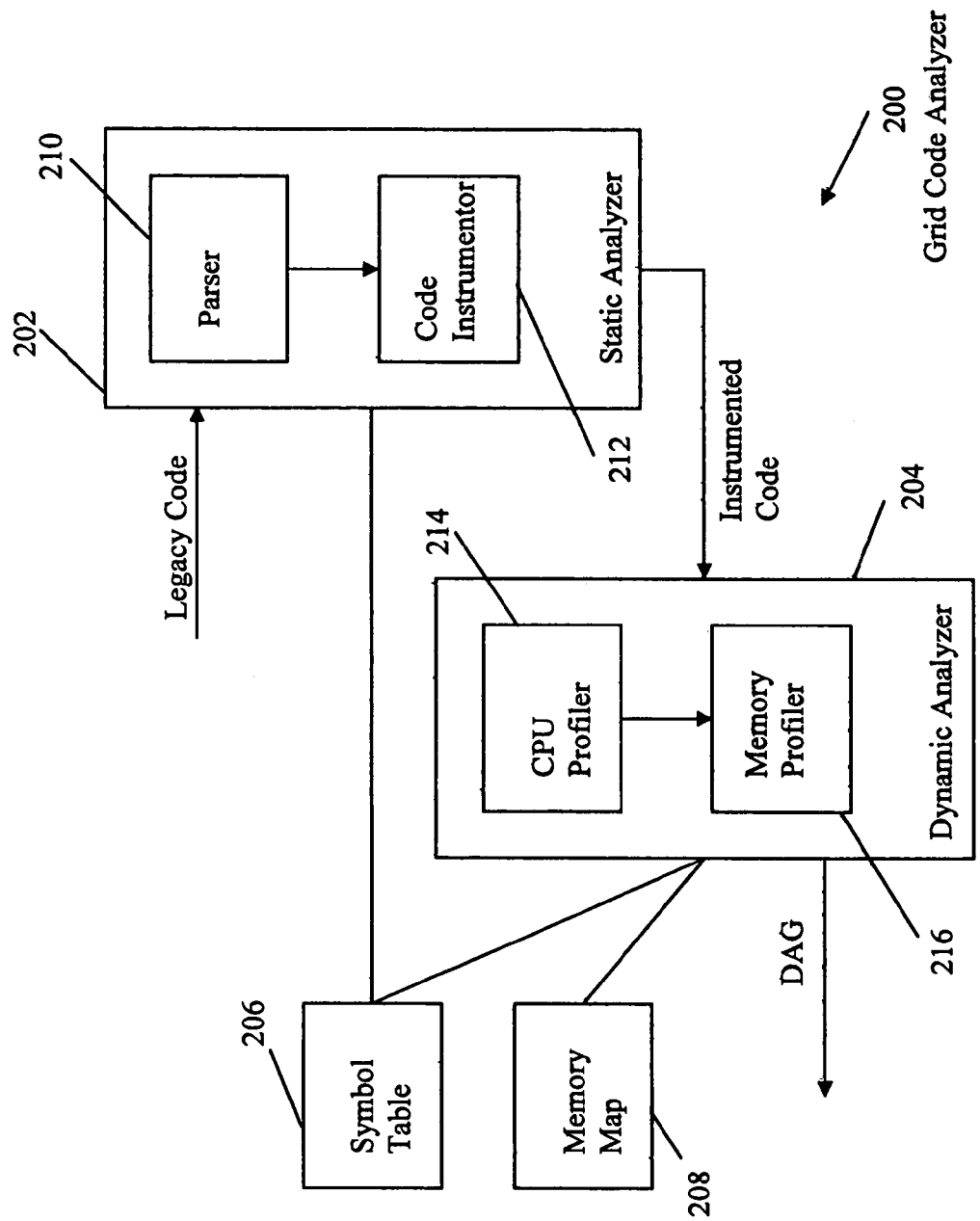
FIG. 2 is a block diagram depicting a grid code analyzer (GCA)

FIG. 2 is a block diagram depicting a GCA. GCA 200 comprises a static analyzer 202, a dynamic analyzer 204, a symbol table 206 and a memory map 208. Static analyzer 202 comprises a parser 210 and a code instrumentor 212. Dynamic analyzer 204 comprises a CPU profiler 214 and a memory profiler 216. In various embodiments of the present invention, GCA 200 accepts a legacy application as input and analyzes and profiles the legacy application program code by performing static and dynamic analysis. GCA 200 generates a DAG which depicts both task and data dependencies among various modules of the legacy application.

Static analyzer 202 comprises a parser 210 and a code instrumentor 212. Parser 210 parses the code of the legacy application input to GCA 200. In an embodiment of the present invention, parsers such as Lex and Yacc which are well known in the art may be used for parsing the legacy application program code. Parser 210 analyzes the dependencies among various modules within the code and partitions the legacy application program code into virtual blocks, which are represented as nodes of the generated DAG.

A legacy application program code is partitioned into virtual blocks in order to obtain a DAG with a manageable number of nodes while maintaining the acyclic nature of DAG. As would be apparent to a person of skill in the art, if each statement in the legacy application code is defined as a task and is represented as a DAG node in order to maintain the acyclic nature of DAG, the resultant DAG would have an unmanageable number of nodes. On the other hand, in a case where the legacy application code comprises one or more functions and each function is defined as a task and is represented as a DAG node, the resultant DAG would have a manageable number of nodes. However, in the latter case, the resultant DAG may contain dependency loops disrupting the acyclic nature of DAGs. For example, if a DAG corresponding to a legacy application code containing a first function and a second function is generated, the resultant DAG would contain two nodes, each node representing one function. If the relationship between the two functions is such that the first function comprises program code for calling the second function and the second function comprises program code for modifying a pointer variable being processed by the first function, the resultant DAG would contain a dependency loop. The dependency loop would be created due to the node representing the first function being dependent on the node representing the second function, and the node representing the second function in turn being dependent on the node representing the first function creating a circular dependency, thereby disrupting the acyclic nature of a DAG.

Hence, in an embodiment of the present invention, in order to generate a DAG corresponding to a legacy application program code, parser 210 partitions the legacy application program code into virtual blocks. Each function in the legacy application program code may be partitioned into a plurality of virtual blocks. For example, a piece of legacy application program code represented as:

```
Int Func1( )
{
    Char *s = ...;
    .......
    J = Func2(s);
    .......
}
``` may be partitioned into three virtual blocks in order to ensure that dependency loops are not created. The part of the code from the start of the function Func1( ) up to the last line before the call of Func2(s) may be represented by a first virtual block. The call to Func2(s) may be represented by a second virtual block, while the remaining part of the code up to the end of Func1( ) may be represented by a third virtual block. As would be apparent to a person of skill in the art, if Func2(s) internally calls multiple functions, multiple virtual blocks may be created accordingly.

Parser 210 parses a legacy application program code and represents the parsed code in symbol table 206. Symbol table 206 maintains details of various symbols such as types, constants, functions and variables declared in the legacy application program code. In an embodiment of the present invention, symbol table 206 is implemented as a hash table wherein a file number, a scope number, a block number and a variable name are used to generate keys corresponding to the variables in the parsed legacy application program code. As is known in the art, a hash table is a data structure that associates keys with values, and enables a lookup function wherein a key value is used to find a corresponding entry in the table.

Code instrumentor 212 inserts instrument strings into the parsed legacy application program code in order to capture the run time information of the legacy application. Parser 210 checks for different classes of dependency relations that may exist for each variable stored in symbol table 206. As each dependency relation is determined, code instrumentor 212 inserts an instrument string into the program code to be used during dynamic analysis of the legacy application. In an embodiment of the present invention, other than inserting instrument strings based on dependency relations between variables, code instrumentor 212 also inserts 'start block' and 'end block' instrument strings to the parsed legacy application program code. A 'start block' instrument string is inserted at the commencement of a function in the legacy application program code and an 'end block' instrument string is inserted when the function exits. These instrument strings enable profiling blocks of the legacy application program code in order to estimate the running time of each block. In an embodiment of the present invention, the 'start block' and 'end block' instrument strings are inserted before and after each virtual block within the parsed legacy application code. In an embodiment of the present invention, code instrumentor 212 further inserts instrument strings within the parsed legacy application program code, which enable insertion or deletion of a tuple in memory map 208, the insertions and deletions being performed in order to track memory allocation of the code during execution.

Dynamic Analyzer 204 collects the runtime information of the legacy application program code made available by the instrument strings inserted in the program code. Dynamic Analyzer 204 uses symbol table 206 to process the instrumented code. In an embodiment of the present invention, a header comprising definitions of the inserted instrumented strings is included in the program code, for processing the instrumented code. The header enables the program code along with the run time information corresponding to the program code to be written into an external file. The information written into the external file is processed offline by Dynamic Analyzer 204.

Dynamic analyzer 204 comprises a central processing unit (CPU) profiler 214 and a memory profiler 216. CPU profiler 214 determines cpu time corresponding to each block of program code. In an embodiment of the present invention, the cpu time is determined by using C specific system calls. These calls are made when the instrumented program code calls the 'start block' and 'end block' instruments. Cpu time is used by the dynamic analyzer 204 to update node weights in the DAG corresponding to the program code.

Memory profiler 216 is called when there is a dependency relation between two blocks of program code and a dependency variable is not a scalar variable. A measure of data exchanged between two blocks of the program code may be obtained by determining the memory allocated to the variables in the program code. The measure of data exchanged between two blocks of the program code is used by the Dynamic Analyzer 204 to obtain edge weights of the DAG corresponding to the program code. In an embodiment of the present invention, the C programming language operator sizeof may be used to determine the size in bytes of each static variable such as int, float, char, etc. being used in the legacy application, thereby determining the memory allocated to the variable. However, the sizeof operator may not be used for determining the memory allocated corresponding to all types of variables, since the operator determines a size allocated on stack memory. In order to determine the size of variables such as a pointer variable, a structure with pointer variables, or a linked list etc., a corresponding size allocated on heap memory is required to be determined. In an embodiment of the present invention, a generic memory tracking function M(t) is used for tracking the memory allocated on heap.

M(t) may be defined as:
sizeof(t) if t∈D
M(t)=S(t) (if t∈{s,u})
M(*t).n other wise
where:
D denotes the set of all primitive data types available in a programming language, eg. int, char, float, double etc., available in C programming language;
t denotes a type of variable;
n denotes the number of data elements in the type t;
{s,u} denotes the set of user defined data types like structure, unions etc., and
S(t)=ΣM(ti), where ti is the i'th element in the structure or union.

The memory tracking function M(t), calculates the size (in bytes) of the type of variable t, when the type is a primitive type, by using the sizeof operator. For pointers and user-defined types like structures and unions, the function M(t) iterates through the inner elements that these types represent and determines the size of these elements. Hence, the memory tracking function M(t) determines the size of pointer variables and structures in a similar manner since determining the size of a pointer variable is equivalent to determining the size of all the elements pointed to by the pointer variable. The size of each element is determined by dereferencing the pointer variable, and if after dereferencing, the variable being pointed to is also a pointer variable, recursively repeating the function.

Memory map 208 is a data structure which maintains an updatable record of the memory allocated on heap during execution of a legacy application program code, and is used for calculating n i.e. the number of data elements in the type t. Memory map 208 comprises a plurality of rows to represent the 3-tuple, i.e. {base pointer, size, offsets}. Hence, a pointer variable pointing to an address between a base pointer and (base pointer+'size'), would have a size equal to 'size' bytes plus the sum of sizes of pointers (if any) at the offsets. Memory map 208 also records structure variables comprising pointer elements with the offsets of the pointer elements being stored in the offsets field of the 3-tuple. In an embodiment of the present invention, a self balancing binary search tree such as an AVL tree is used to implement memory map 208. Memory profiler 216 uses memory map 208 to determine sizes of variables that represents a measure of data exchanged between two blocks of the legacy application program code.

Figure 3:
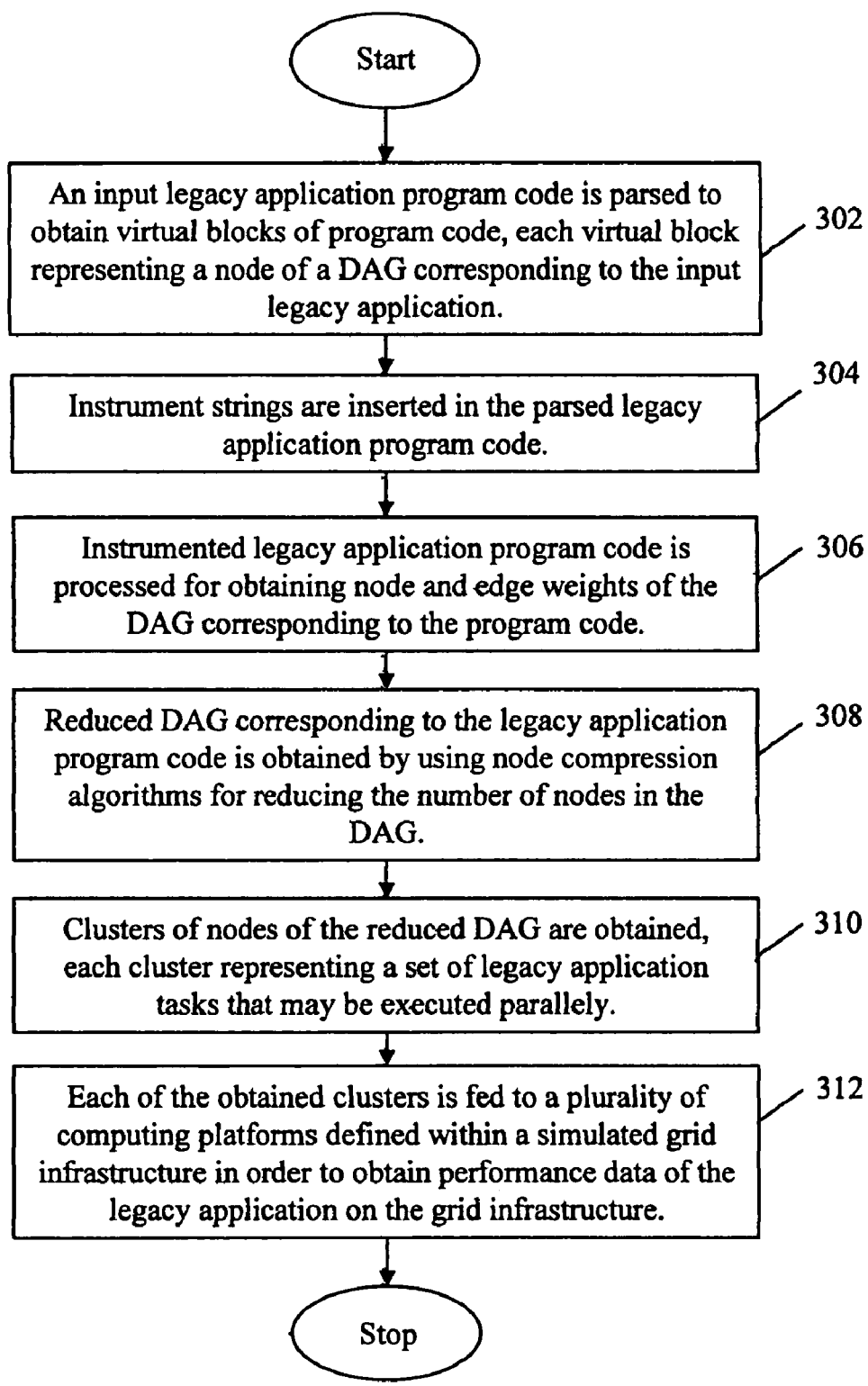
FIG. 3 is a flowchart illustrating a method for assessing the performance of a legacy application migrated to a grid infrastructure.

FIG. 3 is a flowchart illustrating a method for assessing the performance of a legacy application migrated to a grid infrastructure. At step 302, an input legacy application program code is parsed to obtain virtual blocks of program code, each virtual block representing a node of a DAG corresponding to the input legacy application. A virtual block is defined as an application task and the DAG is created corresponding to the obtained virtual blocks of the legacy application program code. The legacy application program code is partitioned into virtual blocks in order to remove dependency loops arising due to dependency relations existing between two or more functions in the program code, and to maintain acyclic nature of the DAG. In an embodiment of the present invention the legacy application program code is analyzed statically and dynamically in order to obtain a DAG corresponding to the legacy application. Creation of virtual blocks reduces the scope of analysis of the program code from a function to a block level.

In an embodiment of the present invention, as the legacy application program code is parsed state information such as virtual block and scope of declaration corresponding to each variable being declared in the program code is stored. Furthermore, a check for different classes of dependency relations that may exist corresponding to each variable being used in the program code is also performed. Examples of the types of dependencies checked for comprise hierarchical dependency, argument level dependency, global value dependency and return value dependency. Hierarchical dependency is a representation of the call hierarchy from a caller application task to a called application task. Argument level dependency is exhibited if an application task A calls another application task B, and passes an argument variable v to application task B, making application task B dependent on application task A for variable v. Global value dependency is exhibited if a variable v is declared with a global scope and is manipulated in an application task A, before being used in an application task B, making application task B dependent on application task A for variable v. Return value dependency is exhibited if an application task A calls an application task B, and uses a return value v, from application task B, making application task A dependent on application task B for the variable v.

At step 304, instrument strings are inserted in the parsed legacy application program code. Instrumentation of the program code facilitates the tracking of data changes occurring through the program as well as the execution path of the program. In an embodiment of the present invention, instrument strings are inserted in the parsed program code in order to determine type(s) of dependency relation corresponding to each variable being used in the program code. In an embodiment of the present invention, other than instrument strings based on dependency relations between variables, a 'start block' and 'end block' instrument strings are also inserted in the parsed legacy application program code. A 'start block' instrument string is inserted at the commencement of a virtual block in the program code and an 'end block' instrument string is inserted when the virtual block exits. These instrument strings enable profiling the legacy application program code in order to estimate the running time of each virtual block. In an embodiment of the present invention, instrument strings enabling tracking memory allocation of the program code during execution are also inserted.

At step 306, the instrumented legacy application program code is processed for obtaining the node and edge weights of the DAG corresponding to the program code. As the instrumented program code is processed information is collected from the instruments that have been inserted in the program code. In an embodiment of the present invention, the cpu time corresponding to each virtual block in the program code is determined by using C specific system calls. These calls are made when the instrumented program code calls the 'start block' and 'end block' instruments. Cpu time is used to determine node weights in the DAG corresponding to the program code. In an embodiment of the present invention, data exchanged between two virtual blocks of the program code is measured in order to determine edge weights in the DAG corresponding to the program code. Furthermore, in an embodiment of the present invention, if an instrument for determining the type of dependency relation between virtual blocks is encountered while processing the instrumented code, a graph is constructed to represent the corresponding virtual blocks and the data flow between these blocks. The graph may also be represented in an XML format.

At step 308, a reduced DAG corresponding to the legacy application program code is obtained by using node compression algorithms for reducing the number of nodes in the DAG. In an embodiment of the present invention, an $\alpha$ compression algorithm and a $\beta$ compression algorithm are used for reducing the DAG. A first threshold value $\alpha$ and a second threshold value $\beta$ are determined. In various embodiments of the present invention, $\alpha$ and $\beta$ are numbers between zero and infinity, such that the value of $\alpha$ is greater than the determined value of $\beta$. In an embodiment of the present invention, the value of $\alpha$ is approximately 1.5 to 2 times the maximum value of edge weight associated with the DAG. In an embodiment of the present invention, the value of $\beta$ is approximately 0.5 to 0.7 times the maximum value of node weight associated with the DAG. The $\alpha$ compression and $\beta$ compression algorithms are described with reference to FIG. 4 and FIG. 5 respectively, in subsequent sections of the disclosure.

At step 310, clusters of nodes of the reduced DAG are obtained, each cluster representing a set of legacy application tasks that may be executed parallely. In an embodiment of the present invention, clustering algorithms well known in the art such as the Edge Zeroing (EZ) algorithm and the Dominant Sequence Clustering (DSC) algorithm may be implemented to obtain the clusters based on the reduced DAG and the determined values of $\alpha$ and $\beta$. In an embodiment of the present invention where DSC algorithm is implemented, the clusters are formed based on critical paths between the nodes of the reduced DAG.

At step 312, each of the obtained clusters is fed to a plurality of computing platforms defined within a simulated grid infrastructure in order to obtain performance data of the legacy application on the grid infrastructure. The performance data may be analyzed to arrive at the advantages and disadvantages (in terms of speed and time of computing) of migrating the legacy application to the defined grid infrastructure. Hence, the performance of the legacy application migrated to a grid infrastructure may be assessed.

Figure 4:
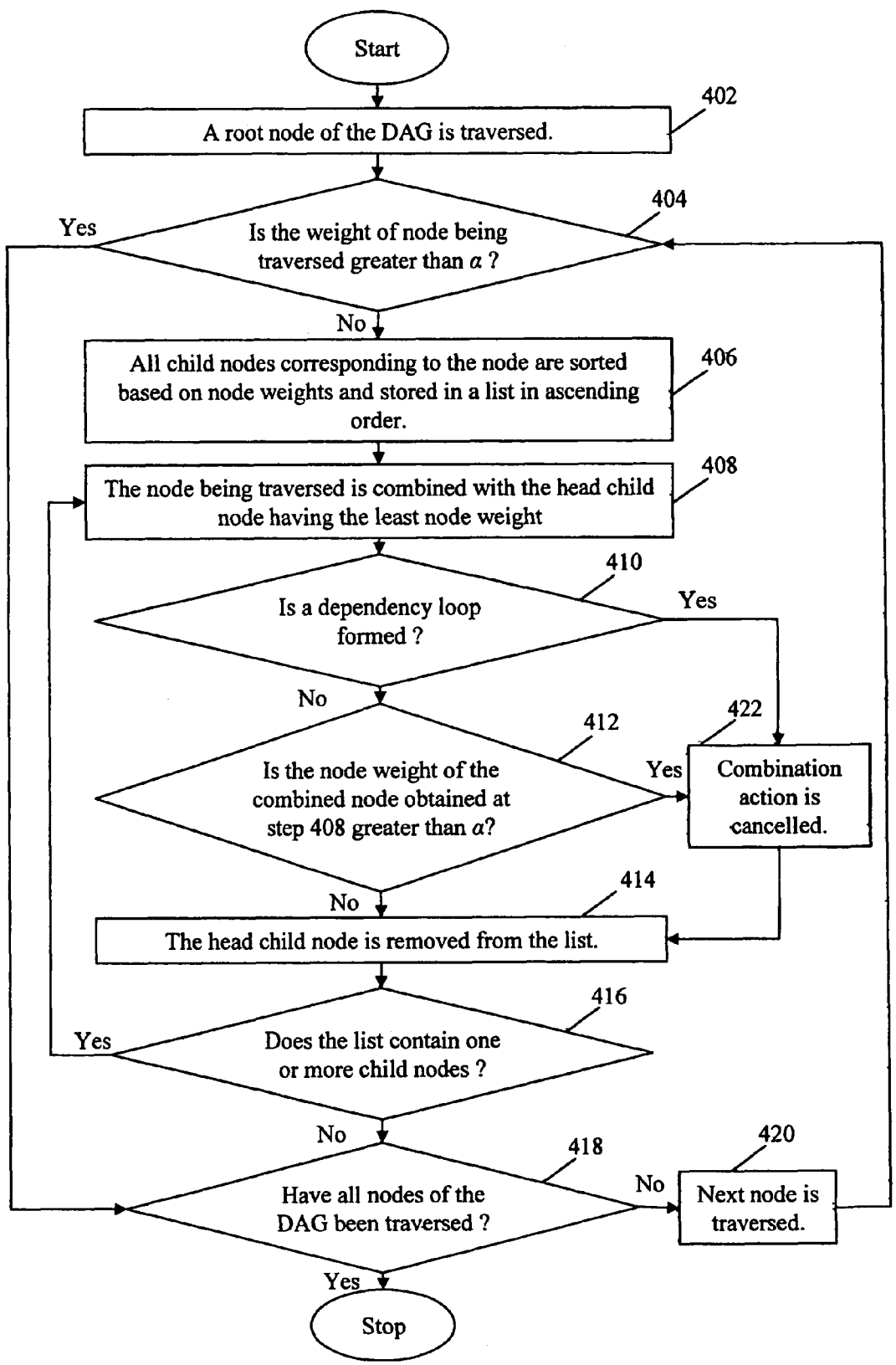
FIG. 4 is a flowchart illustrating the steps of α compression algorithm.

FIG. 4 is a flowchart illustrating the steps of a compression algorithm. At step 402, a root node of the DAG is traversed. At step 404 it is determined if the weight of the node being traversed is greater than $\alpha$. If the weight of the node being traversed is not greater than $\alpha$, then at step 406 all child nodes corresponding to the node are sorted by weight and stored in a list in ascending order. At step 408, the node being traversed is combined with the head child node having the least node weight in the list of child nodes. At step 410 it is determined if a dependency loop such as a DAG triad is formed upon combination. In an embodiment of the present invention, a DAG triad is formed if there is an incoming edge from a node N of the DAG to the combined node obtained at step 408, such that a predecessor node of node N is the same as the predecessor node of the combined node.

At step 412 it is determined if the node weight of the combined node obtained at step 408 is greater than $\alpha$ if a dependency loop is not formed upon combination. If the node weight of the combined node obtained in step 408 is not greater than $\alpha$ then at step 414 the head child node is removed from the list of child nodes. At step 416 it is determined if the list of child nodes contains one or more child nodes. Steps 408 to 416 are repeated until there are no child nodes present in the list obtained at step 406, if it is determined that the list contains one or more child nodes. If the list obtained at step 404 does not contain one or more child nodes, then at step 418 it is determined if all nodes of the DAG have been traversed. At step 420 a next node in the DAG is traversed, if all nodes of the DAG have not been traversed. Step 404 and onwards are repeated iteratively until all nodes of the DAG are traversed. At step 418 if it is determined that all nodes of the DAG have been traversed, a reduced DAG is obtained. At step 422 a combination action performed at step 408 is cancelled, if it is determined at step 410 that a dependency loop is formed upon combination. Further, if it is determined at step 412 that the node weight of the combined node obtained is greater than $\alpha$, a combination action performed at step 408 is cancelled at step 422. Next, step 414 and onwards are repeated iteratively until all nodes of the DAG are traversed.

In an alternate embodiment of the present invention an $\alpha$ compression algorithm is implemented by firstly traversing a DAG beginning from the root node. Secondly, while traversing if a node having a node weight less than $\alpha$ is determined the child node(s) of the determined node are merged with the determined node, beginning with the child node having a least node weight. Thirdly, if upon merging the child node(s) it is determined that a dependency loop is created in the DAG, the merging action is cancelled. The three steps are repeated until every node in the DAG is traversed. In an embodiment of the present invention, a low value of $\alpha$ which is close to $\beta$ results in cancellation of a large number of merging actions, resulting in a reduced DAG which is very similar to the original DAG. On the other hand, a very high value of $\alpha$ which is close to infinity results in the original DAG being reduced to a single node.

Figure 5:
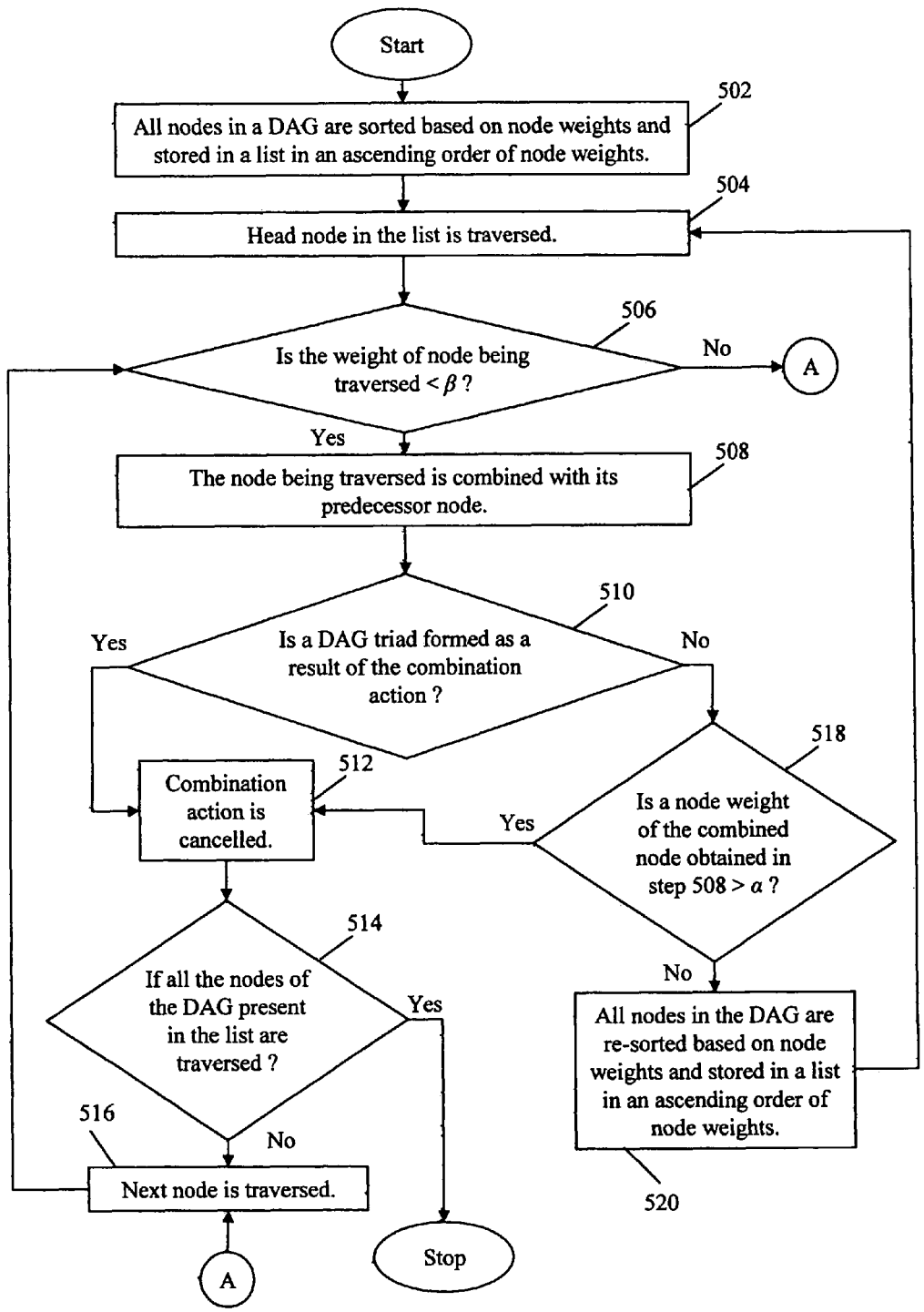
FIG. 5 is a flowchart illustrating the steps of β compression algorithm.

FIG. 5 is a flowchart illustrating the steps of $\beta$ compression algorithm. At step 502 node weights of all nodes in a DAG are sorted and the nodes are stored in a list in an ascending order of node weights. At step 504 a head node in the list is traversed. At step 506 it is determined if weight of the node being traversed is less than $\beta$. At step 508 the node being traversed is combined with its predecessor node, if weight of the node being traversed is less than $\beta$. At step 510 it is determined if a DAG triad is formed as a result of the combination action performed at step 508. In an embodiment of the present invention, a DAG triad is formed if there is an incoming edge from a node N of the DAG to the combined node obtained at step 508, such that a predecessor node of node N is the same as the predecessor node of the combined node.

If it is determined at step 510 that a DAG triad is formed as a result of the combination action performed at step 508, the combination action is cancelled at step 512. At step 514, it is determined if all the nodes of the DAG present in the list are traversed. At step 516 a next node present in the list is traversed if it is determined that all the nodes of the DAG present in the list obtained at step 502 are not traversed. Next, steps 506 and onwards are repeated until all nodes of the DAG are traversed.

If it is determined at step 510 that a DAG triad is not formed as a result of the combination action performed at step 508, it is determined at step 518 if a node weight of the combined node obtained at step 508 is greater than $\alpha$. At step 520 all nodes in the DAG are re-sorted based on node weights and are stored in a list in an ascending order of node weights, if the node weight of the combined node obtained at step 508 is not greater than $\alpha$. Next, steps 504 and onwards are repeated until all nodes of the DAG are traversed. If the node weight of the combined node obtained at step 508 is greater than $\alpha$, the combination action is cancelled at step 512 and step 514 and onwards are repeated until all nodes of the DAG are traversed. At step 506 if it is determined that the weight of the node being traversed is greater than $\beta$ a next node in the list is traversed at step 516 and next step 506 and onwards are repeated until all nodes of the DAG are traversed.

In an embodiment of the present invention, a low value of $\beta$ which is close to 0 results in a reduced DAG which is very similar to the original DAG. On the other hand, a very high value of $\beta$ which is close to infinity results in the original DAG being reduced to a single node.

Therefore the present invention provides a system, a method and a computer program product for analyzing the performance of legacy applications running in a grid environment. The system and method of the present invention may be employed for performing a comparative analysis between performances of a legacy application before and after migration to a grid infrastructure. Hence, the system and method of the present invention enables enterprises to take an informed decision regarding migration to a grid infrastructure. Further the analysis of legacy applications by using the present invention also provide inputs for any re-engineering operations that may have to be performed on the legacy applications for the purpose of migration.

While the exemplary embodiments of the present invention are described and illustrated herein, it will be appreciated that they are merely illustrative. It will be understood by those skilled in the art that various changes in form and detail may be made therein without departing from or offending the spirit and scope of the invention as defined by the appended claims.

The invention claimed is:

1. A system for assessing performance of a software application migrated to a grid infrastructure, the system comprising:

a central processing unit (CPU) and a memory;

a grid code analyzer for generating a directed acyclic graph (DAG) corresponding to the software application by performing static and dynamic analysis;

a grid task generator for reducing the DAG generated by the grid code analyzer; and a grid simulator for simulating performance of the software application on one or more predetermined grid infrastructures, the grid simulator accepting the reduced DAG as input and producing performance data as output;

wherein the grid code analyzer comprises:

a static analyzer for statically analyzing the software application, and comprising:

a parser for parsing the software application by analyzing dependencies between two or more sections of the software application and partitioning the software application into virtual blocks for removing dependency loops in the DAG corresponding to the software application, each node of the DAG representing at least one virtual block; and code instrumentor for inserting instrument strings in the software application for capturing run time and dependency information; and a dynamic analyzer for dynamically analyzing the software application, and comprising:
  a CPU profiler for determining CPU time required for processing each virtual block for obtaining node weights corresponding to each node of the DAG, and
  a memory profiler for determining an amount of data exchanged between a pair of virtual blocks for obtaining edge weight of an edge linking the two nodes of the DAG corresponding to the pair of virtual blocks.

2. The system as claimed in claim 1 wherein the grid task generator reduces the generated DAG by using one or more node compression algorithms for reducing the number of nodes of the DAG.

3. The system as claimed in claim 1 wherein the grid task generator reduces the generated DAG by clustering two or more nodes of the DAG by using one or more clustering algorithms.

4. The system as claimed in claim 1 wherein the grid simulator implements one or more scheduling algorithms for scheduling the input DAG on the one or more predetermined grid infrastructures.

5. The system as claimed in claim 1 wherein the grid code analyzer further comprises a symbol table for storing information regarding symbols such as types, constants, functions and variables declared in the software application, the symbol table being created during static analysis of the software application and being used for dynamic analysis.

6. The system as claimed in claim 5 wherein the symbol table is implemented as a hash table wherein a scope number, a block number and a variable name are used for generating keys corresponding to each symbol declared in the software application.

7. The system as claimed in claim 1 wherein the grid code analyzer further comprises a memory map for maintaining an updatable record of memory allocated on heap during run time of the software application, the memory map being created and used during dynamic analysis of the software application for determining data exchanged between a pair of virtual blocks.

8. The system as claimed in claim 7 wherein the memory map is a data structure implemented as a balanced binary search tree.

9. The system as claimed in claim 1 wherein the instrument strings are inserted based on dependency relations between two virtual blocks determined during parsing of the software application.

10. The system as claimed in claim 1 wherein instrument strings are inserted before and after each virtual block for capturing the run time information of each virtual block during dynamic analysis of the software application.

11. The system as claimed in claim 1 wherein the memory profiler uses a memory tracking function for determining amount of data exchanged between the pair of virtual blocks by using a programming language operator for determining memory allocated on stack, and by dereferencing a pointer variable for determining memory allocated on heap.

12. A method for assessing performance of a software application migrated to a grid infrastructure, the method comprising the steps of:
  generating a directed acyclic graph (DAG) corresponding to the software application by performing static and dynamic analysis;
  reducing the generated DAG;
  simulating performance of the software application by inputting the reduced DAG to one or more predetermined grid infrastructures and obtaining performance data as output; and
  analyzing the performance data for assessing the performance of the software application on the one or more predetermined grid infrastructures;
  wherein the step of generating a DAG comprises:
  statically analyzing the software application by:
  parsing the software application by determining dependencies between two or more sections of the software application and partitioning the software application into virtual blocks for removing dependency loops in the DAG, each node of the DAG representing at least one virtual block; and
  inserting instrument strings in the software application for capturing run time information by tracking the execution path and the data changes occurring during execution of the software application;
  dynamically analyzing the software application by:
  determining CPU time required for processing each virtual block for obtaining node weights corresponding to each node of the DAG, and
  determining amount of data exchanged between a pair of virtual blocks for obtaining edge weight of an edge linking the two nodes of the DAG corresponding to the pair of virtual blocks.

13. The method as claimed in claim 12 wherein the step of parsing comprises determining dependencies such as hierarchical dependencies, argument level dependencies, global value dependencies and return value dependencies.

14. The method as claimed in claim 12 wherein the step of inserting instrument strings comprises inserting at least a start block and an end block instrument strings at the commencement and end of a virtual block respectively for profiling the software application and estimating the running time of each virtual block.

15. The method as claimed in claim 12 wherein the step of reducing the generated DAG comprises reducing the number of nodes of the DAG by using one or more node compression algorithms.

16. The method as claimed in claim 12 wherein the step of reducing the generated DAG further comprises clustering two or more nodes of the DAG by using one or more clustering algorithms.

17. The method as claimed in claim 12 wherein the step of simulating performance of the software application on one or more predetermined grid infrastructures comprises implementing one or more scheduling algorithms for scheduling the input DAG on the one or more predetermined grid infrastructures.

18. The method as claimed in claim 12 wherein the DAG is reduced by an $\alpha$ compression algorithm comprising the steps of:
  a. providing a threshold value of $\alpha$;
  b. traversing a root node of the DAG;
  c. determining if the weight of the node being traversed is greater than $\alpha$;
  d. sorting the one or more child nodes corresponding to the node being traversed based on their node weights and storing the sorted nodes in a list in an ascending order, if the weight of the node being traversed is not greater than $\alpha$;
  e. combining the node being traversed with the head child node having the least node weight in the list;
  f. determining if a DAG triad is formed;
  g. determining if the node weight of the combined node is greater than $\alpha$, if a DAG triad is not formed;
  h. cancelling the combination action performed at step e, if it is determined that the node weight of the combined node obtained is greater than $\alpha$ or a DAG triad is formed;

i. removing the head child node from the list if the node weight of the combined node is not greater than α;
j. determining if the list contains other child nodes;
k. repeating steps e to j, if the list contains other child nodes;
l. determining if all nodes of the DAG have been traversed, if the list does not contain other child nodes; and
m. traversing a next node in the DAG and repeating steps c and onwards iteratively until all nodes of the DAG are traversed, if all nodes of the DAG have not been traversed.

19. The method as claimed in claim 12 wherein the DAG is reduced by a β compression algorithm comprising the steps of:
a. providing a threshold value of β;
b. sorting node weights of all nodes in the DAG based on the node weights and storing the sorted nodes in a list in an ascending order;
c. traversing a head node in the list and determining if weight of the node being traversed is less than β;
d. combining the node being traversed with its predecessor node, if weight of the node being traversed is less than β;
e. determining if a DAG triad is formed as a result of the combination action;
f. cancelling the combination action if it is determined that a DAG triad is formed as a result of the combination action;
g. determining if all the nodes of the DAG present in the list are traversed;
h. traversing a next node in the list and repeating step b and onwards until all nodes of the DAG are traversed, if it is determined that all the nodes of the DAG in the list are not traversed;
i. determining if a node weight of the combined node obtained at step d is greater than a predetermined threshold value α, if it is determined at step e that a DAG triad is not formed;
j. re-sorting all nodes in the DAG based on node weights and storing the sorted nodes in a list in an ascending order, if the node weight of the combined node obtained at step d is not greater than α;
k. repeating step c and onwards until all nodes of the DAG are traversed;
l. repeating step f and onwards until all nodes of the DAG are traversed if the node weight of the combined node obtained at step e is greater than α; and
m. repeating step h and onwards until all nodes of the DAG are traversed if weight of the node being traversed is greater than β.

20. The method as claimed in claims 18 or 19 wherein the threshold value of α is 1.5 to 2 times of the maximum value of edge weight associated with the DAG.

21. The method as claimed in claim 19 wherein the threshold value of β is approximately 0.5 to 0.7 times the maximum value of node weight associated with the DAG.

22. The method as claimed in claims 18 or 19 wherein the threshold values α and β are zero or greater than zero, such that the value of α is greater than the value of β.

23. A computer program product comprising a non-transitory computer usable medium having a computer readable program code embodied therein for assessing performance of a software application migrated to a grid infrastructure, the computer program product comprising:
program instruction means for generating a directed acyclic graph (DAG) corresponding to the software application by performing static and dynamic analysis;
program instruction means for reducing the generated DAG;
program instruction means for simulating performance of the software application by inputting the reduced DAG to one or more predetermined grid infrastructures and obtaining performance data as output; and
program instruction means for analyzing the performance data for assessing the performance of the software application on the one or more predetermined grid infrastructures;
wherein the program instruction means for generating a DAG comprise:
program instruction means for statically analyzing the software application by:
parsing the software application by determining dependencies between two or more sections of the software application and partitioning the software application into virtual blocks for removing dependency loops in the DAG, each node of the DAG representing at least one virtual block; and
inserting instrument strings in the software application for capturing run time information by tracking the execution path and the data changes occurring during execution of the software application;
program instruction means for dynamically analyzing the software application by:
determining CPU time required for processing each virtual block for obtaining node weights corresponding to each node of the DAG, and
determining amount of data exchanged between a pair of virtual blocks for obtaining edge weight of an edge linking the two nodes of the DAG corresponding to the pair of virtual blocks.

24. The computer program product as claimed in claim 23 wherein the DAG is reduced by an α compression algorithm comprising program instruction means for:
a. providing a threshold value of α;
b. traversing a root node of the DAG;
c. determining if the weight of the node being traversed is greater than α;
d. sorting the one or more child nodes corresponding to the node being traversed based on their node weights and storing the sorted nodes in a list in an ascending order, if the weight of the node being traversed is not greater than α;
e. combining the node being traversed with the head child node having the least node weight in the list;
f. determining if a DAG triad is formed;
g. determining if the node weight of the combined node is greater than α, if a DAG triad is not formed;
h. cancelling the combination action performed at step e, if it is determined that the node weight of the combined node obtained is greater than α or a DAG triad is formed;
i. removing the head child node from the list if the node weight of the combined node is not greater than α;
j. determining if the list contains other child nodes;
k. Repeating steps e to j, if the list contains other child nodes;
l. determining if all nodes of the DAG have been traversed, if the list does not contain other child nodes; and
m. traversing a next node in the DAG and repeating steps c and onwards iteratively until all nodes of the DAG are traversed, if all nodes of the DAG have not been traversed.

25. The computer program product as claimed in claim 23 wherein the DAG is reduced by a β compression algorithm comprising program instruction means for:

a. providing a threshold value of $\beta$;
b. sorting node weights of all nodes in the DAG based on the node weights and storing the sorted nodes in a list in an ascending order;
c. traversing a head node in the list and determining if weight of the node being traversed is less than $\beta$;
d. combining the node being traversed with its predecessor node, if weight of the node being traversed is less than $\beta$;
e. determining if a DAG triad is formed as a result of the combination action;
f. cancelling the combination action if it is determined that a DAG triad is formed as a result of the combination action;
g. determining if all the nodes of the DAG present in the list are traversed;
h. traversing a next node in the list and repeating step b and onwards until all nodes of the DAG are traversed, if it is determined that all the nodes of the DAG in the list are not traversed;
i. determining if a node weight of the combined node obtained at step d is greater than a predetermined threshold value $\alpha$, if it is determined at step e that a DAG triad is not formed;
j. re-sorting all nodes in the DAG based on node weights and storing the sorted nodes in a list in an ascending order, if the node weight of the combined node obtained at step d is not greater than $\alpha$;
k. repeating step c and onwards until all nodes of the DAG are traversed;
l. repeating step f and onwards until all nodes of the DAG are traversed if the node weight of the combined node obtained at step e is greater than $\alpha$; and
m. repeating step h and onwards until all nodes of the DAG are traversed if weight of the node being traversed is greater than $\beta$.

26. The computer program product as claimed in claim 24 or 25 wherein the threshold value of $\alpha$ is 1.5 to 2 times of the maximum value of edge weight associated with the DAG.

27. The computer program product as claimed in claim 25 wherein the threshold value of $\beta$ is 0.5 to 0.7 times the maximum value of node weight associated with the DAG.

28. The computer program product as claimed in claim 24 or 25 wherein the threshold values $\alpha$ and $\beta$ are zero and greater than zero, such that the value of $\alpha$ is greater than the value of $\beta$.

* * * * *

UNITED STATES PATENT AND TRADEMARK OFFICE
CERTIFICATE OF CORRECTION

PATENT NO. : 8,117,606 B2  
APPLICATION NO. : 11/810133  
DATED : February 14, 2012  
INVENTOR(S) : Anirban Chakrabarti, Shubhashis Sengupta and Anish Damodaran It is certified that error appears in the above-identified patent and that said Letters Patent is hereby corrected as shown below:

On the Title Page, Item (57), second line of Abstract, "is" should read --are--;

In the Specifications  
Column 3, line 33, "determining amount" should read --determining the amount--;  
Column 4, line 29, "is" should read --are--;  
Column 4, line 38, "would" should read --will--;  
Column 5, lines 41-42, "process based" should read --process-based--;  
Column 5, line 43, "java" should read --Java--;  
Column 5, line 54, "DAG based" should read --DAG-based--;  
Column 7, line 47, "runtime" should read --run time--;  
Column 8, line 65, "self balancing" should read --self-balancing--;  
Column 9, line 1, "represents" should read --represent--;  
Column 12, line 28, "enables" should read --enable--;  
Column 12, line 31, "provide" should read --provides--;

In the Claims  
Column 13, line 53, Claim 11, "amount" should read --the amount--;  
Column 13, line 62, Claim 12, "analysis" should read --analyses--;  
Column 14, line 20, Claim 12, "determining amount" should read --determining the amount--;  
Column 15, line 21, Claim 19, "weight" should read --the weight--;  
Column 15, line 23, Claim 19, "if weight" should read --if the weight--;  
Column 15, line 51, Claim 20, "claims" should read --claim--;  
Column 15, line 57, Claim 22, "claims" should read --claim--;  
Column 15, line 67, Claim 23, "analysis" should read --analyses--;  
Column 16, line 30, Claim 23, "determining amount" should read --determining the amount--;  
Column 16, line 57, Claim 24, "Repeating" should read --repeating--;  
Column 17, line 6, Claim 25, "weight" should read --the weight--;  
Column 17, line 8, Claim 25, "If weight" should read --If the weight--;  
Column 18, line 20, Claim 28, "and" should read --or--.

Signed and Sealed this  
Second Day of July, 2013

Teresa Stanek Rea  
*Acting Director of the United States Patent and Trademark Office*